United States Patent [19]
Kanaka et al.

[11] Patent Number: 5,182,359
[45] Date of Patent: Jan. 26, 1993

[54] MELT-STABLE POLYESTER RESINS AND MOLDED ARTICLES THEREOF

[75] Inventors: Keiichi Kanaka; Kenji Hijikata, both of Shizuoka, Japan

[73] Assignee: Polyplastics Co., Ltd., Osaka, Japan

[21] Appl. No.: 720,156

[22] Filed: Jun. 27, 1991

[30] Foreign Application Priority Data

Jun. 29, 1990 [JP] Japan ................... 2-174142

[51] Int. Cl.$^5$ .................. C08G 63/00; C08G 63/02
[52] U.S. Cl. .................... 528/193; 528/176; 528/272
[58] Field of Search .............. 528/272, 176, 193

[56] References Cited

U.S. PATENT DOCUMENTS

| | | | |
|---|---|---|---|
| 4,877,922 | 10/1989 | Sasaki et al. | 528/272 |
| 4,968,777 | 11/1990 | Nakane et al. | 528/272 |
| 4,968,778 | 11/1990 | Still et al. | 528/272 |
| 5,021,545 | 6/1991 | Nakane et al. | 528/272 |

OTHER PUBLICATIONS

CA 104(10): 69941r Taira, Kazuo et al., "*Plastic containers*", Japan.
CA 72(12):56641p Nakayama, Yozo; et al., "*Polyester with good dyeability*".

*Primary Examiner*—John Kight, III
*Assistant Examiner*—T. Mosley
*Attorney, Agent, or Firm*—Nixon & Vanderhye

[57] ABSTRACT

Moldable polyester resins having high melt-phase stability and which form substantially no thermal decomposition products during melt-phase processing have a carboxyl end group concentration of no greater than 40 milliequivalent/kg, and are the reaction product of (a) an aromatic dicarboxylic acid or its ester-forming derivative, (b) an aliphatic dihydroxy compound having 2 to 8 carbon atoms, and (c) an ester-forming comonomer having the general formula (I):

$$HO-R-O-A-O-R-OH \qquad (I)$$

wherein A represents a divalent organic radical having at least one aromatic ring, R represents a divalent organic radical selected from the group consisting of aliphatic hydrocarbon groups and polyoxyalkylene groups each having 2 to 8 carbon atoms. The ester-forming comonomer is incorporated into the polyester resin chain in an amount between 0.01 to 7 molar %, based on the aromatic dicarboxylic acid.

11 Claims, No Drawings

MELT-STABLE POLYESTER RESINS AND MOLDED ARTICLES THEREOF

RELATED APPLICATIONS

This application may be deemed to be related to commonly owned, copending U.S. patent application Ser. No. 07/717,830, and U.S. application Ser. No. 07/717,829, each being filed on Jun. 21, 1991 in the name of the same inventors as this application, the entire contents of which are expressly incorporated hereinto by reference.

FIELD OF INVENTION

The present invention generally relates to moldable resin compositions exhibiting exceptionally high heat stability when melted. More particularly, the invention is embodied in novel polyester resin molding compositions which are exceptionally stable when melt-molded in an oxygen environment (e.g. extrusion molding) such that little (if any) mold deposits are formed due to resin decomposition. As a result, high-quality molded articles such as films or sheets which have an excellent surface appearance may be produced by molding the compositions of this invention.

BACKGROUND AND SUMMARY OF THE INVENTION

Crystalline thermoplastic polyester resins such as polyalkylene terephthalate resins have been used extensively as an engineering plastic in various fields owing to their excellent mechanical and electrical properties, as well as their physical and chemical characteristics and good processability. Thus, thermoplastic polyester resins have been used to form molded parts including automotive, electrical and electronic applications.

Diversifying the end-use applications for thermoplastic polyester resins, however, often requires specific performance and/or property characteristics. For example, one problem which has prevented thermoplastic resins from being used in a greater number of end-use applications is the propensity for thermal decomposition products (e.g. terephthalic acid) generated during molding to "bleed" from the resin. These decomposition products, which are solid at normal temperatures are thus deposited on the molding apparatus resulting in the deterioration of the surface appearance of a resulting molded article. The present increased demand for a polyester resin and the greater range of its end-use applications make the problem associated with surface appearance increasingly more important from a material selection point of view. Undesirable surface defects may therefore preclude thermoplastic polyester resins from being employed in specific areas of use, especially films and sheets.

For example, when an ordinary polyethylene terephthalate (PET) or polybutylene terephthalate (PBT) is melt-molded into a film in an oxygen atmosphere by, e.g., a process which comprises melt-extruding the resin through a slit and then cooling the extrudate with a chilled roll or a guide bar to give a solid film, solid decomposition products will gradually deposit on the various components in contact with the resin, for example, the slit die, chilled roll and/or guide. These deposits roughen the surface of the formed film, thereby lowering the film's surface gloss. In order to avoid lower film surface gloss, the die, chilled roll and/or guide bar must be cleaned frequently—a complicated operation resulting in production down time and a concomitant economical losses.

Low molecular weight additives, such as various antioxidants or catalyst deactivators, have conventionally been added to thermoplastic polyester resins in order to solve the thermal decomposition problems mentioned above. However, polyester resins containing such an additive will, in many cases, exhibit other problems, such as the bleedout of the additive itself and/or a decrease in the surface gloss of molded articles due to the presence of the additive, even though the heat stability of the resin is improved. Therefore, the development of a more effective means for solving the problems noted above has been needed. It is towards fulfilling such a need that the present invention is directed.

It has now been found that a thermally stable, high-quality aromatic copolyester having a low carboxyl end group (CEG) concentration which does not experience detrimental bleedout of thermal decomposition products (e.g., terephthalic acid) during melt-molding in an oxygen atmosphere (such as melt extrusion) can unexpectedly be obtained by the introduction of a specified comonomer to be described in greater detail below. The resin compositions can be molded by, e.g. extrusion, into films or sheets having good surface appearances without depositing decomposition products which are normally solid at ordinary temperatures (e.g., about 20° C.) during molding.

The present invention relates more specifically to a polyester resin having a CEG of no greater than 40 (meq/kg) and high melt-phase heat stability to an extent that substantially no thermal decomposition products (such as terephthalic acid) are formed during melt-molding. The novel polyester resins of this invention are produced mainly from (a) an aromatic dicarboxylic acid or its ester-forming derivative, and (b) an aliphatic dihydroxy compound having 2 to 8 carbon atoms, which are copolymerized with (c) an ester-forming comonomer compound of the following general formula (I):

HO—R—O—A—O—OH         (I)

wherein A represents a divalent organic radical having at least one aromatic ring, R represents a divalent organic radical selected from the group consisting of aliphatic hydrocarbon groups and polyoxyalkylene groups each having 2 to 8 carbon atoms.

The ester-forming comonomer is employed in an amount sufficient to achieve between about 0.01 to about 7 molar percent (based on the aromatic dicarboxylic acid) of the ester-forming comonomer in the resulting copolyester chain.

The concentration of the carboxyl end group of the copolyesters according to this invention is expressed hereinafter in milliequivalents per kilogram (meq/kg) and as determined by dissolving a weighed amount of a polyester in mixture of benzyl alcohol and chloroform and titrating with benzyl alcoholic sodium hydroxide.

Further aspects and advantages of the present invention will become evident after careful consideration is given to the detailed description of the preferred exemplary embodiments thereof which follow.

DETAILED DESCRIPTION OF THE PREFERRED EXEMPLARY EMBODIMENTS

The basic polymer skeleton of the crystalline thermoplastic polyester resin according to the present invention is produced by polycondensing (a) an aromatic dicarboxylic acid compound with (b) an aliphatic dihydroxy compound having 2 to 8 carbon atoms as the principal comonomers. Examples of the aromatic dicarboxylic acid compound used herein include known aromatic dicarboxylic acids such as terephthalic, isophthalic, napthalenedicarboxylic and diphenyldicarboxylic acids and ester-forming derivatives thereof. These compounds can be sued alone, or in combinations of two or more of the same. Examples of suitable ester derivatives of dicarboxylic acid include dialkyl esters, diphenyl esters and other diacylated compounds, which also can be used alone or in mixtures of two or more of the same.

Examples of the aliphatic dihydroxy compound suitable for use to form the polyester resin according to the present invention include substituted and unsubstituted aliphatic dihydroxy compounds such as ethylene glycol, propylene glycol, butanediol, neopentyl glycol, hexanediol, cyclohexanediol, cyclohexanedimethanol, diethylene glycol and triethylene glycol. The aliphatic dihydroxy compounds may be employed alone or in mixtures of two or more of the same.

A small amount of a trifunctional monomer, such as trimellitic acid, trimesic acid, pyromellitic acid pentaerythritol or trimethylolpropane may optionally be incorporated into polymerization reaction mixture to form a polyester having a branched or crosslinked structure.

The polyester resins of the present invention necessarily will include units derived from an ester-forming comonomer of the following general formula (I):

HO—R—O—A—O—R—OH    (I)

wherein A represents a divalent organic radical having at least one aromatic ring, R represents a divalent organic radical selected from the group consisting of aliphatic hydrocarbon groups and polyoxyalkylene groups each having 2 to 8 carbon atoms. Examples of the divalent organic radicals represented by A in the above formula (I) include arylene groups and substituted arylene groups such as phenylene, naphthylene and diphenylene groups and groups of the following formula (II):

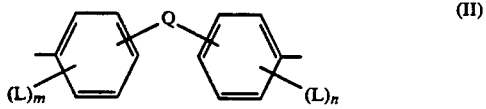

(II)

wherein Q represents an oxy, sulfonyl, carbonyl, methylene, dichloromethylene, ethylidene, butylidene, 2,2-propylidene, 1,1-phenethylidene or phenylenebis(2,2-propylidene) group, L represents an alkyl group having 1 to 4 carbon atoms or a halogen atom, and m n and each represent an integer from 0 to 4, inclusive.

Specific examples of the divalent organic radicals represented by R in the general formula (I) include ethylene, propylene, isopropylene, butylene, isobutylene, neopentylene, hexylene, polyoxethylene, polyoxpropylene and polyoxyisopropylene groups. Especially preferred compounds within the definition of the general formula (I) include 2,2-bis[4-(2-hydroxyethoxy)-phenylene]-propane and 2,2-bis[4-(2-hydroxy-1-methylethoxy)-phenylene]propane.

Units derived from the ester-forming comonomer of the general formula (I) above are introduced into the polyester chain in an amount between 0.01 to 7 molar %, preferably 0.05 to 5 molar %, and most preferably 0.1 to 4.5 molar %, based on the dicarboxylic acid component. When the ester-forming comonomer component (c) is introduced into the polymer chain in amounts less than 0.01 molar %, the CEG is too high and the beneficial effects achieved by the present invention cannot be realized. On the other hand, the melting point and degree of crystallization of the resulting polyester are unfavorably affected when the amount of the ester-forming comonomer is incorporated into the polyester chain in amounts greater than 7 molar %. For example, when more than 7 molar % of the ester-forming comonomer (e.g., ethylene oxide (2 mol) adduct of bisphenol A) is introduced into polybutylene terephthalate (PBT), the melting point of the resulting PBT decreases from 222° C. to around 200° C. or less, and its crystallinity is reduced to 50% or less. As a result, desirable heat-resistance and gas barrier properties are not obtained.

Virtually any conventional process employed to produce polyesters may be employed to form the polyesters of this invention. That is, the polyesters of this invention may be obtained by heating the monomers at 150° C. to 250° C. in the presence of a catalyst to achieve esterification or transesterification reaction, followed by subjecting the monomers to polycondensation reaction conditions under reduced pressure while distilling off excess monomer or reaction by-products.

The catalysts usable to produce the polyester resins of this invention include known catalysts for polycondensation reaction of polyesters, such as tetraalkoxytitaniums, e.g., tetrabutoxytitanium; metal salts of titanium oxalates, e.g., potassium titanium oxalate; tin compounds, e.g., dibutyltin oxide and dibutyltin laurate; metal acetates, e.g., zinc acetate, lead acetate, manganese acetate and calcium acetate; and antimony compounds, e.g., antimony trioxide. These catalysts may be used alone or in combinations of two or more of the same.

The molecular weight of the polymer (including oligomer) obtained by melt-polymerization or solution polymerization according to the present invention can be increased by subjecting the polymer (including oligomer) to so-called solid-phase polymerization conditions (e.g., in a vacuum or in an inert gas at high temperature for a sufficient time) which are controlled so that the particles will not fuse together. The preferred molecular weight is such that the intrinsic viscosity of the polyester is between 0.6 to 1.8, particularly between 0.7 to 1.5.

The polyester resin usually having an extremely low CEG value can be obtained by introducing a very small amount of the specified ester-forming comonomer as described previously. The CEG of the polyester resin according to the present invention is no greater than 40 (meq/kg), and usually no greater than 30 (meq/kg). By comparison, ordinary polyalkylene terephthalate resins typically have a CEG which is not lower than 50 (meq/kg) and at least 40 (meq/kg).

The polyester resins of this invention exhibit high melt-phase heat stability. For example, when polyester resins according to the present invention are melted at a temperature suitable for molding for a time period of 50 minutes, the amount of decomposition products that is formed is at most 0.10%, usually at most 0.05% by weight (based on the total weight of the resin). Thus, the amount of the decomposition products is significantly less in the resins of this invention as compared to conventional polyester resins. As a result, problems associated with conventional polyesters, such as deposits of the decomposition products forming on parts of molding apparatus and/or dies, are practically eliminated. When the polyester copolymer, however, has a high CEG value the intended effect of lessening the amount of decomposition products during melt-phase processing cannot be achieved. Hence, the low CEG value is an important requisite for obtaining the intended effect of the polyester resin according to the present invention.

The compositions of the present invention exhibit excellent performance characteristics even in the absence of other additives. Particularly, the compositions of this invention exhibit improved heat stability to an extent equivalent to the heat stability attained by the addition of various conventional antioxidants. Accordingly, the absence of antioxidants (which generally tend to exude from the composition) is preferable since it will then not be present to bleed out of the compositions. However, the compositions of the present invention may further contain various additives in order to impart other performance characteristics thereto in dependence upon the desired end-use application, provided that the benefits achieved by the compositions of this invention are not hindered. The additives which may optionally be added include stabilizers, ultraviolet light absorbers, antistatic agents, flame retardants and auxiliary flame retardants, coloring agents, such as dyes and pigments, lubricating agents to improve the fluidity and the mold release properties, lubricants, crystallization accelerators (nucleating agents) and inorganic substances.

The resin compositions of the present invention may further contain a small amount of one or more thermoplastic resin as an auxiliary component, provided that the functional attributes of the present invention are not hindered. Any thermoplastic resin which is stable at high temperature may be used as an auxiliary component in the compositions of this invention. Examples of the auxiliary thermoplastic resin include one or more polyolefins, polyamids, polycarbonates, ABS, polyphenylene oxides, polyalkyl acrylates, polyacetals, polysulfones, polyether sulfones, polyether ketones and fluororesins.

The processes for molding the resin composition of the invention into useful articles include any melt molding process. The effects of the present invention are more pronounced when the composition is extruded into films, sheets, monofilaments, fibers and/or solid or hollow tubular structures. The film or sheet may be produced by either an inflation method or a T-die method. Virtually no deposits are formed by the thermal decomposition of the resin composition on the slit, cooling roll and/or guide bar so that the resulting film or sheet have consistent excellent surface appearance.

As described above, the polyester resin molding composition of the present invention exhibits remarkably improved heat stability without exerting any adverse effect on the otherwise beneficial characteristics inherent in polyester resins generally. For example, when the composition is molded into a film or a sheet, the amount of normally solid thermal decomposition products, such as terephthalic acid, is so minimal that no solid deposits are formed on the periphery of extrusion dies, cooling rolls and/or guide bars associated with the molding equipment used to form shaped articles of the polyester resin. Thus, the compositions of the present invention exhibit exceptional molding processability to form high-quality molded articles having consistently excellent surface appearances.

The present invention will be described in more detail by reference to the following non-limiting Examples.

EXAMPLES

In the following Examples, the concentration of the carboxyl end groups (CEG) was determined by dissolving 2 g of polyester resin in 40 ml of a heated mixture of benzyl alcohol and chloroform and titrating it with benzyl alcoholic sodium hydroxide.

The melt-phase stability of the polyester resin was evaluated by determining decomposition products which were solid at ordinary temperatures (20° C.) and which formed when the resin was melted at 260° C. for 50 min or at 285° C. for 50 min. Specifically, 5 grams of the polymer was melted on a hermetically closed hot plate at 260° C. in case of polybutylene terephthalates, or at 285° C. in case of polyethylene terephthalate for 50 minutes. Solid decomposition products (sublimates) of the molten polymer were cooled, solidified and collected and the quantity thereof was determined as a percentage by weight based on the polymer used (i.e., amount melt decomposition products formed).

The surface gloss of molded articles was determined at an angle of 60° C. according to ASTM D 523-85 (injection-molded product) or D 2457-70 (film).

EXAMPLES 1 TO 4

100 mol of (a) dimethyl terephthalate, (b) 1,4-butanediol and (c) ethylene oxide (2 mol) adduct of bisphenol A in amounts given in Table 1 and 0.036 mol of tetrabutoxytitanium (catalyst) were placed in a reactor having a stirrer, nitrogen-inlet tube and reflux distillation tube and stirred at 150° C. in a nitrogen stream for 1 h. The temperature was gradually elevated under continuous stirring from 180° to 240° C. for an additional 3 hours. The introduction of nitrogen was stopped and the pressure in the reactor was gradually reduced so that it was 0.1 mmHg after 1 hour. Stirring was continued under this reduced pressure for 3 hours to give a polymer having a comonomer introduction quantity shown in Table 1. The intrinsic viscosity, melting point, crystallinity, carboxyl end group concentration (CEG) and amount of formation of molten decomposition product at 260° C. of the resultant polymer are given in Table 2.

The copolymer thus produced was molded into pieces with an injection molding machine using conventional techniques and into films by melt extrusion through T-die slit at 260° C., which were rapidly cooled on a roll at room temperature. Formation of deposits on the surfaces of the mold and cooling roll were examined. The surface gloss of the molded pieces and films was also examined. The results are also given in Table 2.

EXAMPLES 5 TO 8

The same procedure as that of Example 1 was repeated except that 100 mol of (a) dimethyl terephthalate, 127.5 mol of (b) 1,4-butanediol, 2.5 mol of (c) a comonomer listed in Table 1 and 0.036 mol of tetrabutoxytitanium as the catalyst were used to give a polymer having the comonomer introduction shown in Table 1. The intrinsic viscosity, melting point, crystallinity, CEG and rate of formation of molten decomposition product at 260° C. of the resultant polymer are given in Table 2. The copolymer thus produced was molded in the same manner as that of Example 1 and the solid deposits and gloss were examined to give the results shown in Table 2.

EXAMPLES 9 AND 10

100 mol of (a) dimethyl terephthalate, (b) ethylene glycol and (c) ethylene oxide (2 mol) adduct of bisphenol A in amounts given in Table 1 and 0.036 mol of dibutyltin diacetate as the catalyst were placed in a reactor having a stirrer, nitrogen-inlet tube and reflux distillation tube and stirred at 150° C. in a nitrogen stream for 1 hour. The temperature was gradually elevated under continuous stirring from 180° to 220° C. for an additional 3 hours. The introduction of nitrogen was stopped and polycondensation reaction was conducted at 270° C. under a pressure of 0.1 mmHg for 3 hours to give a polymer having the properties shown in Table 2. The rate of formation of melt decomposition products of the polymer at 285° C. is also shown in Table 2.

The copolymer thus produced was melt-extruded through a T-die slit at 285° C. and the molded article was rapidly cooled on a roll at room temperature to form a film. The formation of deposits on the surface of the cooling roll and the surface gloss of the films were examined. The results are also given in Table 2.

COMPARATIVE EXAMPLES 1 AND 2

Polybutylene terephthalate homopolymer and polyethylene terephthalate homopolymer similar to those produced in Examples 1 to 8 and Examples 9 and 10, respectively, except that no component (c) was used were processed in the same manner as that described above. The rate of formation of melt decomposition products at 260° C. or 285° C. and the solid deposit formed on the surface of the roll in the formation of the film by the T-die method were examined. The results are given in Table 2. The solid deposit mainly comprised terephthalic acid.

COMPARATIVE EXAMPLE 3

The same procedure as that of Example 1 was repeated except that 10 mol of ethylene oxide (2 mol) adduct of bisphenol A was used as the component (c) and 120 mol of 1,4-butanediol was used as the component (b). The results are given in Table 2. The polymer had low melting point and crystallinity.

COMPARATIVE EXAMPLE 4

The same procedure as that of Example 1 was repeated except that 2.5 mol of triethylene glycol which was different from the component (c) of the present invention was used as the comonomer. The results are given in Table 2.

TABLE 1

| | (c) Comonomer (HO—R—O—A—O—R—OH) | | | | (b) Diol component | |
|---|---|---|---|---|---|---|
| | A | R | feed (mol) | comonomer introduction rate* | kind | feed (mol) |
| Example 1 | 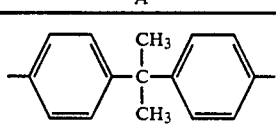 | —CH$_2$CH$_2$— | 2.5 | the same as left | HO(CH$_2$)$_4$OH | 127.5 |
| 2 | " | " | 4.0 | " | " | 126.0 |
| 3 | " | " | 1.0 | " | " | 129.0 |
| 4 | " | " | 0.1 | " | " | 129.9 |
| 5 | " | —CH$_2$CH(CH$_3$)— | 2.5 | " | " | 127.5 |
| 6 | 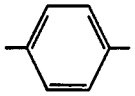 | —C$_2$CH$_2$— | 2.5 | " | " | 127.5 |
| 7 | 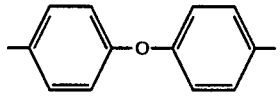 | " | 2.5 | " | " | 127.5 |
| 8 | 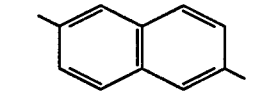 | " | 2.5 | " | " | 127.5 |
| 9 | 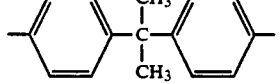 | —CH$_2$CH$_2$ | 2.5 | the same as left | HO(CH$_2$)$_2$OH | 147.5 |
| 10 | " | " | 0.5 | " | " | 150.0 |
| Comp Ex. 1 | — | — | — | — | HO(CH$_2$)$_4$OH | 130.0 |
| 2 | — | — | — | — | HO(CH$_2$)$_2$OH | 150.0 |

TABLE 1-continued

| (c) Comonomer (HO—R—O—A—O—R—OH) | | | | (b) Diol component | |
|---|---|---|---|---|---|
| A | R | feed (mol) | comonomer introduction rate* | kind | feed (mol) |
| 3 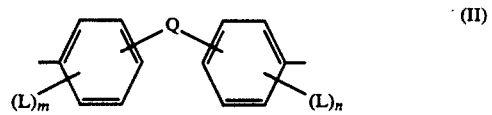 | —CH₂CH₂— | 10.0 | 9.8 | HO(CH₂)₄OH | 120.0 |
| 4  | —CH₂CH₂— | 2.5 | 0.8 | " | 127.5 |

*(molar % based on phthalic acid group) determined by ¹H-NMR spectroscopy

TABLE 2

| | Melting point (°C.) | Intrinsic viscosity | Crystal-linity (%) | CEG (meq/kg) | Rate of formation of melt decomposition products from pellets (% by wt.) | Film production | | Injection molding | |
|---|---|---|---|---|---|---|---|---|---|
| | | | | | | deposit on cooling roll | | Surface gloss of film (after 2 h) | deposit on mold (after 2 h) | surface gloss of molding (after 2 h) |
| | | | | | | after 0.5 h | after 2 h | | | |
| Example | | | | | | | | | | |
| 1 | 218 | 1.0 | 53 | 12.1 | 0.01> | none | none | 72 | none | 81 |
| 2 | 215 | 0.9 | 50 | 10.5 | 0.01> | none | none | 79 | none | 80 |
| 3 | 220 | 1.0 | 54 | 13.7 | 0.01> | none | none | 73 | none | 82 |
| 4 | 222 | 1.0 | 55 | 18.2 | 0.05 | slight | small | 65 | none | 79 |
| 5 | 217 | 1.1 | 51 | 11.7 | 0.01 | none | none | 70 | none | 80 |
| 6 | 219 | 1.0 | 51 | 10.9 | 0.02 | none | none | 62 | none | 77 |
| 7 | 218 | 0.9 | 52 | 12.2 | 0.01 | none | none | 70 | none | 76 |
| 8 | 218 | 1.0 | 51 | 11.5 | 0.01 | none | none | 66 | none | 76 |
| 9 | 252 | 1.1 | — | 11.1 | 0.02 | none | none | 80 | — | — |
| 10 | 255 | 1.1 | — | 14.0 | 0.03 | none | slight | 82 | — | — |
| Comp. Ex. | | | | | | | | | | |
| 1 | 222 | 1.0 | 55 | 54.9 | 0.14 | significant white deposit | significant white deposit | 40 | small | 77 |
| 2 | 256 | 1.2 | — | 56.1 | 0.20 | significant white deposit | significant white deposit | 60 | — | — |
| 3 | 195 | 0.9 | 41 | 41.5 | 0.11 | small | small | 60 | slight | 75 |
| 4 | 220 | 1.0 | 53 | 52.0 | 0.14 | significant white deposit | significant white deposit | 45 | small | 76 |

**The molting was conducted at 285° C. for 50 min in Examples 9 and 10 and Comparative Example 2 and at 260° C. for 50 min in other Examples.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A moldable polyester resin having high melt-phase stability said polyester resin having a carboxyl end group concentration of no greater than 40 milliequivalent/kg, and is the reaction product of (a) an aromatic dicarboxylic acid or its ester-forming derivative, (b) an aliphatic dihydroxy compound having 2 to 8 carbon atoms, and (c) an ester-forming comonomer having the general formula (I):

HO—R—O—A—O—R—OH   (I)

wherein A represents a divalent organic radical having at least one aromatic ring, R represents a divalent organic radical selected from the group consisting of aliphatic hydrocarbon groups and polyoxyalkylene groups each having 2 to 8 carbon atoms, and wherein said ester-forming comonomer is incorporated into the polyester resin chain in an amount between 0.01 to 7 molar % based on the aromatic dicarboxylic acid.

2. A polyester resin according to claim 1, wherein the aliphatic dihydroxy compound consists essentially of 1,4-butanediol.

3. A polyester resin according to claim 1 or 2, wherein the divalent radical A of the formula (I) is selected from the group consisting of phenylene groups, napthylene groups, diphenylene groups, and groups of the formula (II):

(II)

wherein Q represents an oxy, sulfonyl, carbonyl, methylene, dichloromethylene, ethylidene, butylidene, 2,2-propylidene, 1,1-phenethylidene or phenylenebis(2,2-propylidene) group, L represents an alkyl group having 1 to 4 carbon atoms or a halogen atom, and m and n each represent an integer from 0 to 4, inclusive.

4. A polyester resin according to claim 3, wherein R in the formula (I) is selected from the group consisting of ethylene, propylene, isopropylene, butylene, isobutylene, neopentylene, hexylene, polyoxethylene, polyoxpropylene, and polyoxyisopropylene groups.

5. A polyester resin according to claim 1, wherein the ester-forming comonomer is selected from the group consisting of 2,2-bis[4-(2- hydroxyethoxy)phenylene]-propane and 2,2-bis [4-(2-hydroxy-1-methylethoxy)-phenylene]propane.

6. A polyester resin according to claim 1 or 2, wherein the divalent organic radical A of the compound represented by formula (I) is selected from the group consisting of 2,2-bis(4-phenylene)propane, phenylene, hydroxy-4,4'diphenylene and naphthylene groups, and wherein R is an ethylene or isopropylene group.

7. A molded article consisting essentially of the polyester resin according to claim 1 or 2.

8. A molded article as in claim 7, in the form of a film or a sheet.

9. A polyester resin according to claim 1, wherein said ester-forming comonomer is incorporated into the polyester resin chain in an amount between 0.05 to 5 malar % based on the aromatic dicarboxylic acid.

10. A polyester resin according to claim 1, wherein said ester-forming comonomer is incorporated into the polyester resin chain in an amount between 0.1 to 4.5 malar % based on the aromatic dicarboxylic acid.

11. A polyester resin according to claim 1, 9 or 10, wherein said carboxyl end group concentration is no greater than 30 meq/kg.

* * * * *

UNITED STATES PATENT AND TRADEMARK OFFICE
CERTIFICATE OF CORRECTION

PATENT NO. : 5,182,359

DATED : January 26, 1993

INVENTOR(S) : KANAKA et al

It is certified that error appears in the above-identified patent and that said Letters Patent is hereby corrected as shown below:

```
Column 2, line 1, after "and" delete "a';
          line 61, after "and" delete "as" and insert --is--.

Column 3, line 14, change "sued" to --used--.

Column 5, line 62, after "sheet" delete "have consistent" and insert
--will consistently have an--.

Column 6, line 31, after "amount" insert --of--.
```

Signed and Sealed this

Twenty-third Day of November, 1993

Attest:

BRUCE LEHMAN

*Attesting Officer*        *Commissioner of Patents and Trademarks*